(12) United States Patent
Berthereau et al.

(10) Patent No.: US 8,191,832 B2
(45) Date of Patent: Jun. 5, 2012

(54) METHOD AND DEVICE FOR AN AIRCRAFT BUFFET REDUCTION

(75) Inventors: Mathieu Berthereau, Auterive (FR); Michel Mazet, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 537 days.

(21) Appl. No.: 12/413,986

(22) Filed: Mar. 30, 2009

(65) Prior Publication Data

US 2009/0266938 A1      Oct. 29, 2009

(30) Foreign Application Priority Data

Mar. 31, 2008 (FR) ...................................... 08 01754

(51) Int. Cl.
*G05D 1/00* (2006.01)
(52) U.S. Cl. ...... 244/194; 244/195; 244/90 R; 244/90 A; 244/198
(58) Field of Classification Search .................. 244/198, 244/201, 75.1, 194, 195, 90 R, 90 A, 90 B
See application file for complete search history.

(56) References Cited

U.S. PATENT DOCUMENTS

| 4,479,620 | A | * | 10/1984 | Rogers et al. ................. 244/195 |
|---|---|---|---|---|
| 4,706,902 | A | | 11/1987 | Destuynder |
| 4,796,192 | A | | 1/1989 | Lewis |
| 6,416,017 | B1 | | 7/2002 | Becker |
| 6,565,045 | B1 | | 5/2003 | Correge |

FOREIGN PATENT DOCUMENTS

| FR | 2 531 676 | 2/1984 |
|---|---|---|
| FR | 2 792 285 | 10/2000 |

OTHER PUBLICATIONS

Preliminary Search Report dated Nov. 18, 2008 w/ English translation.

* cited by examiner

*Primary Examiner* — Timothy D Collins
*Assistant Examiner* — Jamie S Stehle
(74) *Attorney, Agent, or Firm* — Dickinson Wright PLLC

(57) ABSTRACT

A method and device of dynamically reducing the buffeting of an airplane. The method is carried out by detecting a risk of buffeting of the airplane in flight by a monitor. At least one control surface is turned by an actuator arranged at a trailing edge of each wing of the airplane. The control surface is turned, at a predetermined respective rate of turn, into a predetermined respective position to modify lift profile of the wing along a wingspan length to reduce lift in at least one buffeting-generating region of each wing.

4 Claims, 2 Drawing Sheets

METHOD AND DEVICE FOR AN AIRCRAFT BUFFET REDUCTION

FIELD OF THE INVENTION

The present invention relates to a method and a device for dynamically reducing the buffeting of an airplane, particularly of a civil or military transport airplane.

BACKGROUND OF THE INVENTION

As specified hereinbelow, the buffeting (the English term "buffet" is widely recognized) taken into consideration in the present invention corresponds to vibrations of the airplane, particularly in the cockpit, which are caused by aerodynamic effects applied to the structure of the wings, due to flow separation.

It is known that, in general, for performance reasons, it is preferable for an airplane to fly, in cruising flight, at a maximum permissible altitude. A maximum permissible altitude such as this is determined for an airplane chiefly on the strength of two criteria, namely a minimum rate of climb which has a predetermined value, for example 300 feet per minute (approximately 5.48 km/h), and minimal maneuverability. As far as this minimal maneuverability is concerned, aeronautic regulations dictate that an airplane, flying at its ceiling, that is to say flying at the maximum permissible altitude (for its weight) must be capable of effecting a 1.3 g maneuver, g being the acceleration due to gravity, which means that the angle of attack needs to be relatively large and that relatively high demands are made on the wings in terms of lift. Under such conditions, this maneuver is not limited by the maximum lift of the wings, which will generally allow a maneuver at a G-factor far higher than 1.3 g, but is limited by airplane vibrational phenomena known as buffeting, namely vibrations which are generated by aerodynamic effects applied to the structure of the wings and due to flow separation. These vibrations may be so great that they prevent the pilot from reading the flight instruments or from commanding the required G-factor of 1.3 g. For these reasons, aeronautic regulations have defined a buffet onset limit (the English term "buffet onset" is widely recognized) which represents a maximum acceptable level of vibration (in the cockpit). As a result, the aforementioned minimal maneuver at 1.3 g has to be performed before this buffet onset limit is reached or, at the extreme, at the moment this limit is reached. The purpose of dynamically reducing buffeting according to the invention is, therefore, to act on this limit with a view to making it easier to effect the aforementioned minimal maneuver.

It is known that buffeting of the aforementioned type occurs when a high level of lift is generated on a particular section of a wing, as a result of flow separation that creates unstable aerodynamic forces on the wing, which forces cause the structure of the airplane to vibrate. In general, flow separation appears initially on the out-board part of each wing.

There are various customary solutions for delaying this flow separation and therefore the onset of buffeting.

A first commonplace solution is to reduce the level of lift in the region of the wing concerned (the buffeting-generating region), for example its out-board part. In this case, greater lift is generated on the in-board part of the wing and a lower amount of lift is generated on the out-board part of the wing. A change in lift such as this may in particular be obtained by altering the twist of the wing. However, this customary solution modifies the lift distribution of the wing, which is generally defined for maximum performance in cruising flight, thus degrading wing performance during the flight and particularly in cruising flight (generally at 1 g).

A second customary solution is to mount vortex generators on the wings, these corresponding to mechanical elements that act on the flow and are intended to stabilize the flow in the region of each wing concerned and thus limit the structural response of this wing and therefore the level of vibrations. Such vortex generators improve the quality of the flow at high angles of attack, but lead to drag under normal flight conditions, because of their presence on the wings, and this may degrade airplane performance.

As a result, the aforementioned commonplace solutions capable of limiting the onset of buffeting have a negative effect on airplane flight performance and are therefore not satisfactory.

SUMMARY OF THE INVENTION

It is an object of the present invention to overcome these disadvantages. The invention relates to a method which is able dynamically to reduce, in a simple and effective way, the buffeting of an airplane without having a negative impact on the flight performance of this airplane.

To this end, according to the invention, said method is notable in that:
  the state of the airplane in flight is monitored in such a way as to be able to detect a risk of buffeting corresponding to a situation for which the airplane is in a particular flight envelope; and
  when a risk of buffeting is detected during flight, at least one control surface, which is arranged at the trailing edge of the corresponding wing and which is capable of acting on the lift of this wing is turned automatically at a predetermined rate of turn, on each wing of the airplane so as to bring the control surfaces into predetermined respective positions that enable the profile of the lift of the wings to be modified along the length of the wingspan with a view to locally reducing the lift in at least one buffeting-generating region of each wing.

Thus, by virtue of the invention, when (and only when) there is a risk of the onset of buffeting, the lift of the wings is locally reduced in the buffeting-generating regions, thus making it possible dynamically to reduce the buffeting of the airplane. The fact of the matter is that by reducing the lift in these buffeting-generating regions, the buffeting-generating flow separation is delayed, and the moment at which the aforementioned buffet onset limit is reached is thus likewise delayed.

Thus, by virtue of the invention, there is in particular no need to modify the shape of the wing (which may thus be optimized for cruising flight at 1 g) in order to allow the airplane to perform the aforementioned minimal 1.3 g maneuver which is required by aeronautical regulations. As a result, it is possible in full or at least in part, to dispense with the aforementioned customary solutions which have a negative effect on airplane performance.

In addition, because the turning of the control surfaces is performed only if there is a risk of the onset of buffeting, the solution according to the invention has no action on the flight in all the phases of flight for which such a risk does not exist, and therefore does not have a negative impact on airplane performance.

In one particular embodiment, when a risk of buffeting is detected, at least two control surfaces which can be turned independently are turned automatically on each wing.

For preference, said control surfaces include ailerons and/or flaps or tabs of the airplane which are positioned at the trailing edges of the wings of the airplane.

In the case of a flap, the predetermined rate of turn of the flap is advantageously between 0.2°/s and 2°/s and the predetermined position, obtained after turning, is turned through an angle of between −5° and +5° from the initial position prior to turning.

Moreover, in the context of the present invention, said dynamic reduction in the buffeting can be activated when the airplane is brought into one of various particular (buffeting-generating) flight envelopes. In a preferred embodiment, the airplane is in such a particular flight envelope for which a risk of buffeting is detected, when the following two conditions are simultaneously satisfied:

the altitude of the airplane is above a predetermined altitude; and a G-factor command, commanded by a pilot of the airplane is above a predetermined G-factor.

The present invention also relates to a device for dynamically reducing the buffeting of an airplane, particularly a civil or military transport airplane.

According to the invention, said device is notable in that it comprises:

first means for monitoring the state of the airplane in flight so as to be able to detect a risk of buffeting corresponding to a situation for which the airplane is in a particular flight envelope;

for each wing of the airplane, at least one control surface which is positioned at the trailing edge of the corresponding wing and which is able to alter the lift of this wing; and second means for automatically determining turn commands and transmitting them automatically to actuators of said control surfaces when a risk of buffeting is detected by said first means said second means being formed in such a way as to determine turn commands intended to bring said control surfaces, at predetermined respective rates of turn, into predetermined respective positions that enable the profile of the lift of the wings to be modified along the length of wingspan, so as locally to reduce the lift at least at one buffeting-generating region of each wing.

The present invention also relates to an airplane, particularly a transport airplane, which comprises a device like the aforementioned one.

BRIEF DESCRIPTION OF THE DRAWINGS

The figures of the attached drawing will make it easier to understand how the invention may be embodied. In these figures, identical references denote elements that are similar.

DETAILED DESCRIPTION OF THE INVENTION

Figure 1:
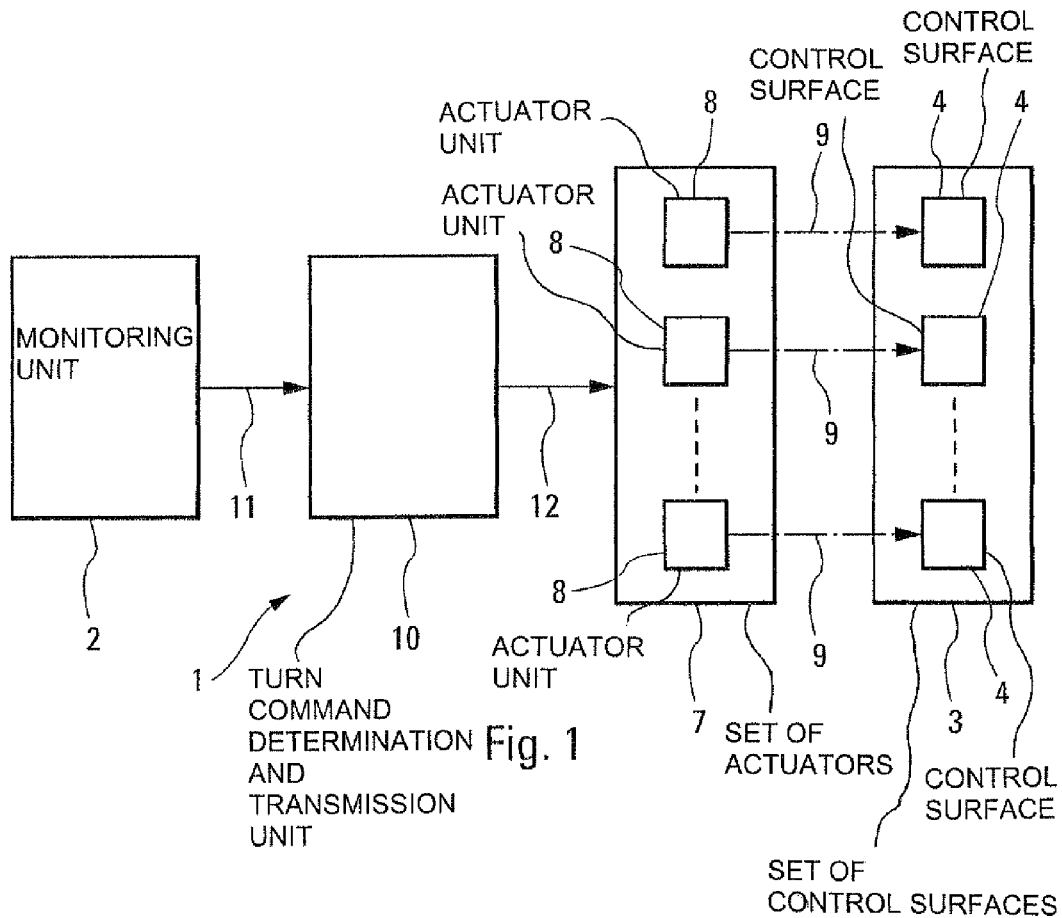
FIG. 1 is a block diagram of a device according to the invention intended dynamically to reduce the buffeting of an airplane.

The device 1 according to the invention and depicted schematically in FIG. 1 is intended dynamically to reduce the buffeting of an airplane A, particularly a civil or military transport airplane.

In the context of the present invention buffeting (the English term "buffet" is widely recognized) means vibration in the airplane A and particularly in the cockpit, which is generated by aerodynamic effects applied to the structure of the wings 6 as a result of flow separation. This buffeting occurs when the airplane A is in a particular flight envelope.

According to the invention, said device 1, which is an on-board device, comprises:

means 2 for monitoring the state of the airplane A in flight so as to be able to detect a risk of buffeting corresponding to a situation for which the airplane A is in a particular (buffeting-generating) flight envelope, as specified hereinbelow;

a set 3 of control surfaces 4 which are positioned at the trailing edges 5 of the wings 6, which are able to act on the lift of a wing 6 and which can be turned independently. To implement the invention, at least one control surface 4 of this type is provided on each wing 6 of the airplane A;

a set 7 of customary actuators 8, which are connected respectively via links 9 to said control surfaces 4 and which are able to modify the respective turn angles of these control surfaces 4, on the basis of turn commands received; and means 10 which, for example, form part of a flight computer customarily found in the airplane A, which are connected by links 11 and 12 respectively to said means 2 and to said set 7 of actuators 8 and which are formed in such a way as automatically to determine turn commands and transmit these automatically to said actuators 8 of the control surfaces 4 when a risk of buffeting is detected by said means 2. These means 10 are formed in such a way as to determine turn commands intended to bring said control surfaces 4, at predetermined rates of turn, into predetermined respective positions that enable the profile of the lift of the wings 6 to be modified along the length of the wingspan so as locally to reduce the lift at least at a buffeting-generating region 13 of each wing 6.

Thus, when (and only when) there is a risk of the onset of buffeting, the device 1 according to the invention locally reduces the lift of the wings 6, and does so in the buffeting-generating regions 13, making it possible dynamically to reduce the buffeting of the airplane A. The fact of the matter is that by reducing the lift in said buffeting-generating regions 13, said device 1 delays the buffeting-generating flow separation caused there and thus delays the moment at which the airplane A reaches the buffet onset limit.

Figure 3A:
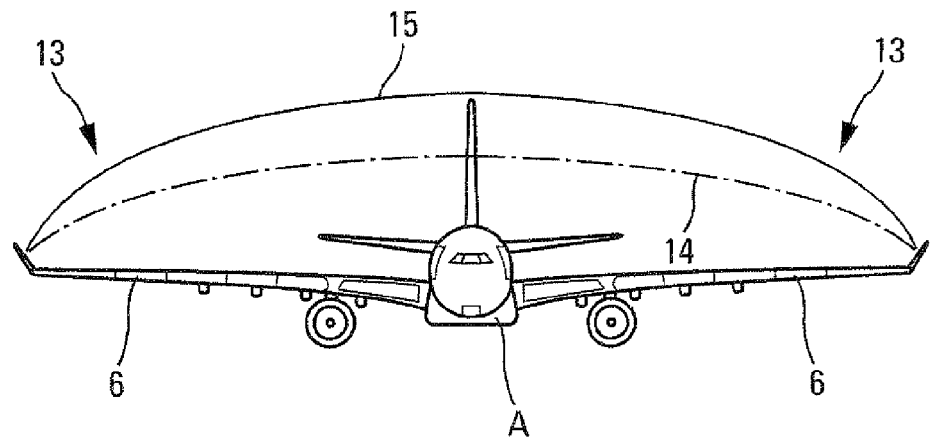
FIGS. 3A and 3B schematically depict an airplane showing the distribution of lift during flight, respectively in the absence of a device according to the invention and when a device according to the invention is activated.

FIG. 3A depicts the distribution of lift on the wings 6 of the airplane A along the length of the wingspan:

using a trace 14 drawn in broken line to represent a 1 g maneuver which generally corresponds to cruising flight; and using a continuous line 15 for a 1.3 g maneuver.

This FIG. 3A corresponds to a customary situation in the absence of a device 1 according to the invention (or when such a device is present on the airplane but is not activated or is faulty).

Figure 3B:
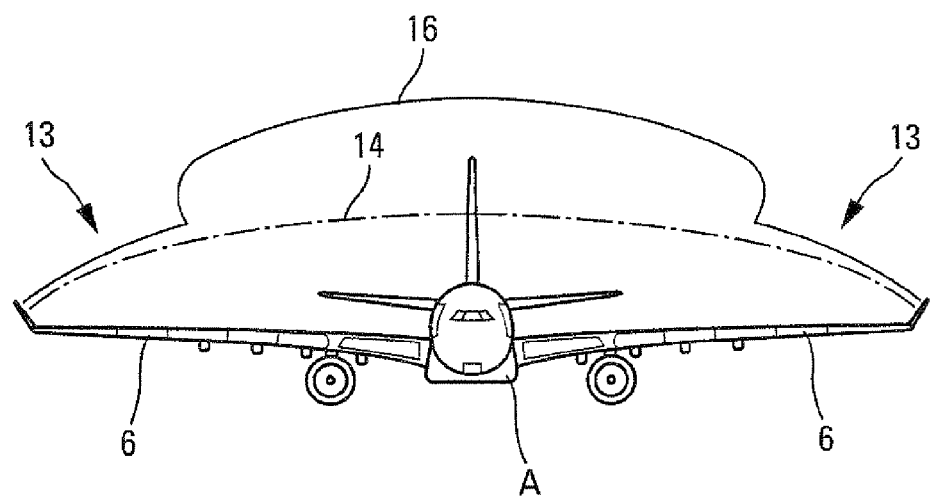

FIG. 3B corresponds to a similar situation, in which by contrast the device 1 according to the invention has been activated. As may be seen from this FIG. 3B (with a trace 16 in continuous line showing the distribution of lift during activation), the device 1 according to the invention makes it possible to reduce the lift at the out-board regions 13 of the wings 6, which are the buffeting-generating regions for this type of airplane A. Reducing the lift in these regions 13 therefore makes it possible to delay the onset of buffeting. Of course, if, for a particular type of airplane or for a particular flight envelope, the buffeting-generating regions are situated at some other point on the wings 6, for example at their in-board part, the device 1 commands the control surfaces 4 in such a way as to reduce the lift at this other point.

Thus, by virtue of the action of the device 1 according to the invention, there is no need, in particular, to modify the shape of the wings 6 (which can thus be optimized for cruising flight at 1 g) in order to allow the airplane A to perform a minimal 1.3 g maneuver as mentioned previously, as required by aeronautical regulations.

In addition, because the turning of the control surfaces 4 is performed only if there is a risk of the onset of buffeting, the device 1 according to the invention has no action on the flight in all the phases of flight for which such a risk does not exist, and therefore does not have a negative impact on the performance of the airplane A, particularly in cruising flight.

Figure 2:
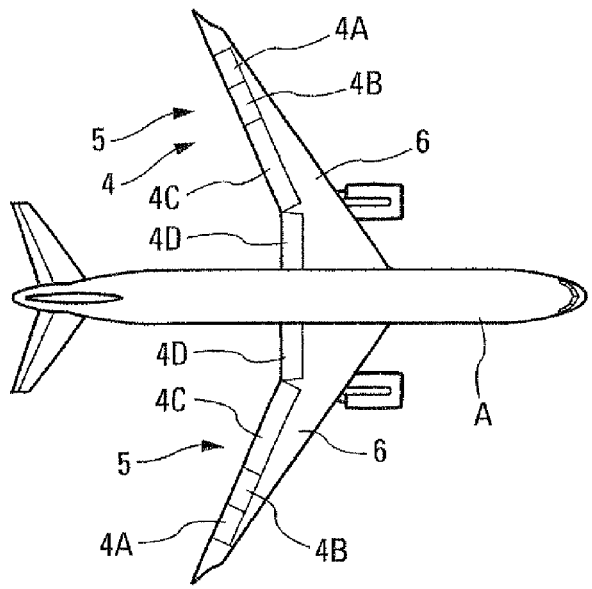
FIG. 2 is a plan view of an airplane, showing the control surfaces which are turned according to the invention.

For preference, said control surfaces 4 include ailerons 4A, 4B and/or flaps or tabs 4C, 4D which are positioned at the trailing edges 5 of the wings 6 of the airplane A, as depicted in FIG. 2.

In the case of a flap 4B, 4C, in a preferred embodiment:
the predetermined rate of turn of the flap 4B, 4C is in the range of values [0.2°/s; 2°/s] and is preferably equal to 0.50/s; and
the predetermined position, obtained after turning, is turned through an angle in the range of values [−5°; +5°] and which is preferably equal to 2° from the initial position prior to turning.

With such a predetermined rate of turn, the definitive turned position is obtained approximately four seconds after the onset of actuation, allowing this final turned position to be reached at the moment the airplane A reaches 1.3 g from its initial 1 g position if turning is begun as soon as this maneuver is instigated. The fact of the matter is that, in general, when an airplane A is flying at its maximum altitude, it takes it about four to five seconds to reach 1.3 g from cruising flight at 1 g.

Further, in the context of the present invention, said dynamic reduction in the buffeting is activated when the airplane A is brought into a particular (buffeting-generating) flight envelope. In a preferred embodiment, the airplane A is in such a particular flight envelope, for which the means 2 detect a risk of buffeting, when the following two conditions are simultaneously satisfied:
the altitude of the airplane A is above a predetermined altitude. To detect this, the device 1 comprises, in addition, customary means (not depicted) for measuring the current altitude of the airplane A and means (not depicted) for comparing this measured current altitude against said predetermined altitude, for example an altitude which is a predetermined margin below a maximum permissible altitude; and
a G-factor command, commanded by a pilot of the airplane A, is above a predetermined G-factor, for example 1.2 g, which means that the pilot is placing a command higher than this value, for example a 1.3 g command. To do this, the device 1 additionally comprises customary means (not depicted) for measuring the G-factor commanded by the pilot, particularly using a control stick, and means (not depicted) for comparing this measured commanded G-factor against said predetermined value.

Further, in another particular embodiment, said (buffeting-generating) flight envelope may be defined using software on the basis of the altitude and a measurement of the current G-factor, rather than a controlled G-factor. It is also possible to base activation not on an altitude but on a reduced coefficient of lift level which indicates that the airplane is in a zone in which the wing has a high coefficient of lift, that is to say a zone in which buffeting may arise if there is a G-factor demand.

In the preferred embodiment depicted in FIG. 2, the device 1 according to the invention comprises, for each wing 6 of the airplane A, four control surfaces 4, namely two ailerons 4A, 4B and two flaps or tabs 4C and 4D. In this case, in order dynamically to reduce the buffeting, the device 1 may turn, on each wing 6:
the out-board ailerons 4A up by 5°;
the in-board aileron 4B also up by 5°;
the out-board flap or tab 4C up by 3°; and
the in-board flap or tab 4D down by 2°.

The invention claimed is:

1. A method of dynamically reducing the buffeting of an airplane, comprising the steps of:
    detecting a risk of buffeting of the airplane in flight by a monitor; and
    turning, by an actuator, at least one control surface arranged at a trailing edge of each wing of the airplane, wherein:
    said at least one control surface is turned, at a predetermined respective rate of turn, into a predetermined respective position to modify lift profile of the wings along a wingspan length to reduce lift in at least one buffeting-generating region of each wing,
    the predetermined respective rate of turn is between 0.2°/s and 2°/s and the predetermined position is at an angle of between −5° and +5' relative to initial position, prior to turning, and
    the risk of buffeting is detected by the monitor, when the following two conditions are simultaneously satisfied:
    altitude of the airplane is above a predetermined altitude; and
    a G-factor command of the airplane is above a predetermined G-factor.

2. The method as claimed in claim 1, wherein at least one of said control surfaces is an aileron of the airplane.

3. The method as claimed in claim 1, wherein at least one of said control surfaces is a flap or tab of the airplane.

4. The method as claimed in claim 1, the risk of buffeting is detected by the monitor, when the following two conditions are simultaneously satisfied:
    there is a reduced coefficient of lift level which indicates that the airplane is in a zone in which a wing has a high coefficient of lift; and
    there is a G-factor demand.

* * * * *